United States Patent [19]

Pyzik et al.

[11] Patent Number: 5,508,120
[45] Date of Patent: Apr. 16, 1996

[54] BORON CARBIDE CERMET STRUCTURAL MATERIALS WITH HIGH FLEXURE STRENGTH AT ELEVATED TEMPERATURES

[75] Inventors: Aleksander J. Pyzik; Sharon M. Fuller; Donald R. Beaman, all of Midland, Mich.

[73] Assignee: The Dow Chemical Company, Midland, Mich.

[21] Appl. No.: 289,967

[22] Filed: Aug. 12, 1994

[51] Int. Cl.$^6$ ............................................. B32B 9/00
[52] U.S. Cl. ........................... 428/688; 428/699; 428/698
[58] Field of Search ....................... 75/236, 203; 156/89; 428/688, 615, 689, 621, 698, 699; 164/97; 228/122

[56] References Cited

U.S. PATENT DOCUMENTS

| | | | |
|---|---|---|---|
| 3,796,564 | 3/1974 | Taylor et al. | 75/203 |
| 4,269,899 | 5/1981 | Fuyama | 428/698 |
| 4,602,956 | 7/1986 | Parthlow | 428/698 |
| 4,693,944 | 9/1987 | Sugisawa | 428/698 |
| 4,702,770 | 10/1987 | Pyzik et al. | 75/236 |
| 5,011,063 | 4/1991 | Claar | 228/122 |
| 5,039,633 | 8/1991 | Pyzik et al. | 501/93 |
| 5,196,238 | 3/1993 | Pyzik | 164/97 |
| 5,308,422 | 5/1994 | Askay et al. | 156/89 |

Primary Examiner—Patrick J. Ryan
Assistant Examiner—Patrick Jewik

[57] ABSTRACT

Prepare boron carbide-aluminum structural composites by infiltrating molten aluminum or aluminum alloy into a porous preform that is either unbaked or baked at a temperature of up to 1800° C. to form a densified cermet and then heat treat the cermet in air or an oxygen-containing atmosphere to form a dense outer surface layer of aluminum oxide. The resulting structural cermets can withstand prolonged exposure to temperatures above the melting point of aluminum without suffering undue degradation of physical properties such as flexure strength.

7 Claims, No Drawings

5,508,120

BORON CARBIDE CERMET STRUCTURAL MATERIALS WITH HIGH FLEXURE STRENGTH AT ELEVATED TEMPERATURES

BACKGROUND OF THE INVENTION

This invention relates generally to boron carbide-aluminum ceramic-metal composites (cermets) suitable for use as structural parts and their preparation. This invention relates particularly to cermets yielding structural parts that can withstand prolonged exposure, in air, at temperatures of 625° Centigrade (° C.) or above. This invention relates more particularly to such cermets that have a surface layer of aluminum oxide ($Al_2O_3$) and their preparation.

U.S. Pat. No. 4,605,440 discloses a process for preparing boron carbide-aluminum composites. The process includes a step of heating a powdered admixture of aluminum (Al) and boron carbide ($B_4C$) at a temperature of 1050° C. to 1200° C. The process depletes most of the Al by forming a mixture of several ceramic phases that differ from the starting materials.

U.S. Pat. No. 4,702,770 discloses a method of making a $B_4C$—Al composite. The method includes a preliminary step of heating $B_4C$ powder, in the presence of free carbon, at temperatures ranging from 1800° C. to 2250° C. This step reduces reactivity of $B_4C$ with molten Al. During this step, the $B_4C$ particles from a rigid network that, after infiltration by molten Al, substantially determines mechanical properties of resulting composites.

U.S. Pat. No. 4,718,941 discloses a method of making metal-ceramic composites from ceramic precursor starting constituents. The constituents are chemically pretreated, formed into a porous precursor and then infiltrated with molten reactive metal. The chemical pretreatment alters starting constituent surface chemistry and enhances molten metal infiltration. Ceramic precursor grains, such as $B_4C$ particles, held together by multiphase reaction products formed during infiltration constitute a rigid network that substantially determines mechanical properties of a resultant composite.

In preparing a $B_4C$—Al cermet via infiltration of molten Al into a porous $B_4C$ preform, reactivity depends primarily upon reaction time. This poses a major problem because chemistry changes as a front of molten Al moves into the preform. The change in chemistry results in a cermet with large differences in microstructure. A portion of the preform that first comes into direct contact with infiltrating metal differs significantly, in terms of amount of reaction phases and reaction phase morphology, from a portion that comes into direct contact with infiltrating metal at or near completion of infiltration. These differences lead to residual stresses that promote cracking of resulting cermets.

Post-infiltration heat treatments of a cermet, typically conducted in a vacuum or in argon at temperatures exceeding that at which metal components of the cermet melt, lead to two additional problems. First, they promote reductions in free metal content and make initial differences even more pronounced. As a result, cracking increases in severity. Second, the heat treatments result in increased porosity, especially at or near external surfaces of the cermet. The porosity results because molten Al does not wet $B_4C$ or most boron-aluminum-carbon (B—Al—C) phases at temperatures of less than 900° C. As a result, surface tension forces metal toward external surfaces of the cermet, thereby creating a zone of porosity.

SUMMARY OF THE INVENTION

An aspect of the invention is a method for making a $B_4C$—Al structural composite. The method comprises sequential steps: a) infiltrating molten aluminum or aluminum alloy into a porous $B_4C$ preform to form a densified $B_4C$—Al cermet; and b) heat treating the densified cermet in the presence of air or an oxygen-containing atmosphere at a temperature of at least about 625° C. for a period of time sufficient to yield (1) a microstructure characterized by isolated $B_4C$ grains or clusters of $B_4C$ grains surrounded by a multiphase matrix that comprises aluminum borides, aluminum borocarbides and free metal, and (2) a dense surface layer of aluminum oxide, the surface layer being substantially free of carbon. The preform is either unheated greenware or greenware that has been heat treated at a temperature of 1800° C. or less.

Another aspect is a $B_4C$—Al structural composite having a dense surface layer of $Al_2O_3$ that is substantially free of carbon, and a microstructure that comprises isolated $B_4C$ grains or clusters of $B_4C$ grains surrounded by a multiphase matrix that comprises aluminum borides, aluminum borocarbides and free metal, the metal being Al or an Al alloy.

DETAILED DESCRIPTION

Boron carbide is a ceramic material characterized by high hardness and superior wear resistance. It is a preferred starting material for the process aspect of the invention, particularly when it is present as a porous preform.

A second preferred starting material for the process aspect is Al or an Al alloy that has an Al content of greater than 80 percent by weight (wt %), based upon alloy weight. Aluminum is typically used in cermets to impart toughness or ductility to the ceramic material.

The process aspect of the invention begins with a porous ceramic preform or greenware article prepared from $B_4C$ powder by conventional procedures. These procedures include slip casting a dispersion of the ceramic powder in a liquid or applying pressure to powder in the absence of heat. The powder desirably has a particle diameter within a range of 0.1 to 10 micrometers (μm). Ceramic materials in the form of platelets or whiskers may also be used.

The preform may contain a ceramic filler material in an amount of from greater than 0 to 50 wt %, based upon total preform weight. The preform preferably contains from 70 to about 95 wt % $B_4C$ and from about 5 to 30 wt % ceramic filler. The percentages are based upon total preform weight and total 100%. The ceramic filler material is at least one of titanium diboride, titanium carbide, silicon boride, $Al_2O_3$ and silicon carbide.

The porous preform is desirably baked at a temperature of at least 1400° C. prior to infiltration. Baking should continue for at least 15 minutes, desirably at least 30 minutes and preferably about two hours or more. If the preform has an infiltration distance (depth of metal penetration) of less than 0.3 inches (about 0.8 centimeters (cm)), baking before infiltration is not necessary because infiltration is substantially complete before large microstructural differences develop. Although not necessary, a heat treatment or baking at a temperature of 100°–1300° C. may be used for infiltration distances of less than 0.3 inches (about 0.8 cm).

If the infiltration distance is 0.3 inches (about 0.8 cm) or larger, the porous preform must be baked at a temperature of at least 1400° C., preferably within a range of from 1400° C. to less than 1800° C. The temperature is maintained for a period of from about 15 minutes to about 5 hours, preferably from about 1 to about 3 hours. This heat treatment (baking) slows down chemical reaction kinetics during infiltration with molten metal in comparison to infiltration of a porous preform that has not been heat treated, especially for those with large infiltration distances (up to 12 or even 13 inches). Baking therefore allows production of large parts without excessive chemical reaction and attendant microstructural differences between various areas of a resulting cermet part.

Baking temperatures that are below 1400° C., even within a range of 1350° C. to less than 1400° C., do not slow down chemical reaction kinetics enough to yield generally uniform microstructures when infiltration distances exceed 0.8 cm, particularly when such distances are much greater than 0.8 cm.

Baking temperatures of 1800° C. or more prior to infiltration lead to uniform microstructures, but promote formation of excess carbon. During a post infiltration heat treatment, the excess carbon reacts with residual unreacted metal to form amounts of aluminum carbide ($Al_4C_3$) that exceed one wt %, based on total cermet weight. The presence of $Al_4C_3$ is highly undesirable as it adversely affects physical properties of cermet parts resulting from a post-infiltration heat treatment as described herein.

Cermet parts resulting from infiltration of baked $B_4C$ preforms with infiltration distances greater than 0.8 cm have more uniform microstructures than those resulting from infiltration of unbaked $B_4C$ preforms with the same infiltration distance. Although they have a more uniform microstructure, the cermet parts are not suitable for extended use at high temperatures because of residual unreacted metal. In order to overcome this deficiency, the resulting cermet parts must be subjected to an additional (post-infiltration) heat treatment. The additional heat treatment occurs at a temperature within a range of from about 660° to about 1250° C., preferably from about 660° to about 1100° C., more preferably from about 800° to about 950° C., in the presence of air or some other oxygen-containing atmosphere. This heat treatment has a duration sufficient to allow slow reactions between residual unreacted metal and $B_4C$ or B—Al—C reaction products or both. The reactions promote some reduction of free (unreacted) metal amounts and development of large parts with a generally uniform microstructure that is substantially free of cracks induced by residual stresses.

The additional heat treatment also promotes formation of a dense and substantially continuous $Al_2O_3$ surface layer that serves several purposes. First, it protects the heat treated cermet from further oxidation. Second, it slows movement of liquid metal from internal regions of the cermet to its surface portions. Third, it puts the cermet part under compressive pressure thereby improving its flexure strength. Fourth, it provides chemical stability and improves corrosion resistance since $Al_2O_3$ is much more chemically stable than either Al or $B_4C$.

Post-infiltration heat treatments at temperatures outside the range of from about 660° to about 1250° C. yield unsatisfactory results. Temperatures of less than about 660° C. lead to reactions that are too slow to reduce residual unreacted metal levels to 15 wt %, based on total cermet weight, or less. The residual unreacted metal levels preferably fall within a range of from about 2 to about 8 wt %, based on total cermet weight. In addition, oxidation occurs so slowly at these temperatures that the $Al_2O_3$ surface layer does not have sufficient thickness to accomplish the foregoing purposes. Temperatures in excess of 1250° C. lead to formation of undesirable amounts of aluminum carbide ($Al_4C_3$) and an $Al_2O_3$ surface layer that is not uniform in thickness.

The post-infiltration heat treatment has a duration that typically ranges from 1 to about 100 hours, desirably from about 10 to about 75 hours, and preferably from about 25 to about 75 hours. Cermet parts wherein the infiltration distance is 0.8 cm or less must be subjected to the same post-infiltration heat treatment if they are to be suitable for such high temperature use. A duration in excess of 100 hours increases production costs, but yields no substantial additional changes in microstructure over those occurring at 100 hours. A duration of less than 1 hour does not allow enough change to occur in the microstructure and produces an $Al_2O_3$ layer that is too thin to fulfill the foregoing purposes.

Structural composites prepared by the process aspect of the invention are characterized by presence of (1) a bulk microstructure containing isolated $B_4C$ grains or clusters of $B_4C$ grains surrounded by a multiphase matrix and (2) an $Al_2O_3$ surface layer. The matrix comprises at least one, preferably at least two, of aluminum borides, aluminum borocarbides and free metal, wherein the metal is either aluminum or an aluminum alloy. The composites comprise from about 40 to about 75 wt % $B_4C$ grains, from about 20 to about 50 wt % aluminum borides and aluminum borocarbides and from about 2 to about 8 wt % aluminum or aluminum alloy, all percentages being based upon composite weight and totaling 100%. The aluminum borides and aluminum borocarbides are selected from the group consisting of $AlB_{24}C_4$, $Al_3B_{48}C_2$, $Al_4BC$, $AlB_2$, and $AlB_{12}$. The aluminum borides and borocarbides are desirably $AlB_{24}C_4$ and $AlB_2$, preferably with a ratio of $AlB_{24}C_4/AlB_2$ that is within a range of from about 10:1 to about 1:5. The latter range is more preferably from about 10:1 to about 2:1.

Phases such as $AlB_{24}C_4$ and $AlB_2$ are more oxidation resistant and therefore more desirable than either $B_4C$ or $Al_4BC$. When large clusters of $AlB_{24}C_4$ are present close to a surface of a structural composite, the post-infiltration heat treatment results in a thinner $Al_2O_3$ layer than when $Al_4BC$ is close to the surface. Alternating between $AlB_{24}C_4$ clusters and $Al_4BC$ produces an $Al_2O_3$ layer of variable thickness. Maximizing $AlB_{24}C_4$ content near the surface leads to a generally uniform $Al_2O_3$ layer that is more desirable than an $Al_2O_3$ layer of variable thickness.

The thickness of the $Al_2O_3$ surface layer depends largely upon heat treatment temperature and time. For example, a heat treatment at 600° C. for 200 hours produces an $Al_2O_3$ layer having a thickness of only about 2 µm. Heat treatments of the same duration at 800° C., 900° C. and 1000° C. produce respective $Al_2O_3$ layer thicknesses of 12–15 µm, 50–75 µm and 100 µm. The $Al_2O_3$ layer actually consists of at least two sublayers, an outer sublayer of relatively large $Al_2O_3$ fibers that have a thickness of 0.1 to 0.2 µm and an intermediate zone or sublayer of $Al_2O_3$ fibers that have a thickness of about 100Å (1000 nanometers). The intermediate sublayer is disposed between the outer sublayer and an interface between the $Al_2O_3$ layer and the cermet part or substrate upon which the $Al_2O_3$ layer is formed.

Chemical analysis of the $Al_2O_3$ surface layer shows that the layer contains a small amount of boron (B), but no carbon (C). The amount of B varies from about 2 to about 6 percent by volume (vol %), based upon total layer volume. An amount of 2 vol % is typically found in the outer sublayer whereas an amount of 6 vol % is more typical of the intermediate sublayer, particularly close to the interface. The chemical analysis does not reveal any boron oxide ($B_2O_3$), so the B is most likely present as boron-containing Al—B—C and Al—B ceramic phases such as $Al_3B_{48}C_2$.

The structural composites of the invention have a number of potential end uses, many of which build upon the high temperature flexure strength and Young's modulus (stiffness) retention of such composites. The composites can be used as automotive parts, particularly as engine parts such as valves, and as structural parts that require high specific strength at temperatures up to 1000° C.

The composites of the invention are surprisingly useful as structural materials that can withstand prolonged (hundreds of hours) exposure to temperatures in excess of 660° C., the melting point of aluminum, but less than 1000° C. Pure $B_4C$ has poor oxidation resistance. At temperatures above 450° C. in the presence of air, $B_4C$ starts to oxidize forming excessive amounts of $B_2O_3$. This leads, in turn, to a rapid reduction of flexure strength from a room temperature (23° C.) strength of 350 megapascals (MPa) to a strength at 800° C., after oxidation in air for a period of 200 hours, of about 100 MPa. At room temperature, Al metal has a flexure strength of about 70 MPa. At 660° C., Al melts and its strength reduces to 0 MPa. The structural composites of the invention unexpectedly have flexure strengths at room temperature that equal or exceed that of $B_4C$ at room temperature. The structural composite flexure strengths typically range from 460–500 MPa at room temperature, 380–450 MPa at 900° C. and 200–250 MPa at 1300° C.

The structural composites have a hardness (measured by Vickers indentation method with 14.4 kg load) that is between 1350 $kg/mm^2$ to 1700 $kg/mm^2$. A hardness of 1350 $kg/m^2$ is achievable after a heat treatment of 10–15 hours. A longer heat treatment of at least 25 hours, typically 25–50 hours, leads to a hardness of 1700 $kg/m^2$.

The structural composites have physical properties other than hardness and flexure strength that are noteworthy. They have a fracture toughness of between 6 and 7 $MPa \cdot m^{1/2}$ and a Young's modulus that ranges between 320 and 360 gigapascals (GPa). The composites have an electrical conductivity that is similar to pure aluminum.

The structural composites of the invention are light in weight with a density that ranges from about 2.7 grams per cubic centimeter ($g/cm^3$) (for a 100% $B_4C$ preform) to less than 3.2 $g/cm^3$ when $B_4C$ is combined with a ceramic filler material.

When a ceramic filler material is used to prepare the structural composites of the invention, the filler is present in the composites either as isolated grains or as part of the clusters of $B_4C$ grains. The amount of ceramic filler material is from about 1 to about 25 vol %, based upon total composite volume.

The following examples further define, but do not limit the scope of the invention. Unless otherwise stated, all parts and percentages are by weight.

EXAMPLE 1

$B_4C$ (ESK specification 1500, manufactured by Elektroschemeltzwerk Kempten of Munich, Germany, and having an average particulate size of 3 μm) powder was dispersed in distilled water to form a suspension. The suspension was ultrasonically agitated, then adjusted to a pH of 7 by addition of $NH_4OH$ and aged for 180 minutes before being cast on a plaster of Paris mold to form a porous ceramic body (greenware) having a ceramic content of 69 vol %. The $B_4C$ greenware was dried for 24 hours at 105° C. The greenware sizes were 120×120×10 millimeters (mm) (thin tiles) and 120×120×16 mm (thick tiles).

Pieces of the greenware were used as is (unbaked), baked at 1300° C. for 120 minutes, baked at 1400° C. for 120 minutes, baked at 1800° C. for 60 minutes or baked at 2200° C. for 60 minutes. All baking and sintering took place in a graphite element furnace. The baked greenware pieces were then infiltrated with molten Al (a specification 1145 alloy, manufactured by Aluminum Company of America that is a commercial grade of Al, comprising less than 0.55% alloying elements such as Si, Fe, Cu and Mn) with a vacuum of 100 millitort (13.3 Pa) at 1180° C. for 120 minutes to provide cermet pieces.

Cermet pieces prepared from the thin tiles were all quite uniform from top to bottom even though some differences were noticeable. As such, the baking temperature did not have a significant impact upon microstructure.

Cermet pieces prepared from the thick tiles had nonuniform microstructures that varied from bottom (closest to infiltrating metal) to top (farthest from the infiltrating metal) in amount of B—Al—C phases and in phase morphology. The bottoms had a microstructure of equiaxed $AlB_2$ and $Al_4BC$ with less than 2 vol % free Al. The tops had a microstructure of $AlB_2$ and $Al_4BC$ in a form resembling comparatively large cigars (50–100 μm in length) in an Al matrix. The amount of free Al ranged between 5–15 vol %. The microstructural differences were specially visible in cermets resulting from greenware pieces baked at 1300° C.

Infiltration times in excess of 2 hours tend to yield nonuniform microstructures with some cracking of the cermet pieces. For example, infiltration times of 3 and 5 hours produce cracking and splitting in cermets resulting from greenware baked at 1300° C. This problem may be reduced or eliminated by baking the $B_4C$ greenware at a temperature in excess of 1300° C.

TABLE I

| $B_4C$ Bake Temp (°C.) | Bake Time (minutes) | Part Uniformity (Bottom to Top) | | Vickers Hardness* ($kg/mm^2$) | |
| --- | --- | --- | --- | --- | --- |
| | | 10 mm Thick Greenware | 16 mm Thick Greenware | Before Heat Treatment | After Heat Treatment |
| 20 | 0 | Uniform | Nonuniform | 1300 | 1550 |
| 1300 | 120 | Uniform | Nonuniform | 700 | 1420 |
| 1400 | 120 | Uniform | Uniform | 450 | 1700 |
| 1800 | 120 | Uniform | Uniform | 480 | 1750 |
| 2200 | 60 | Uniform | Uniform | 450 | 1030 |

*14.4 Kg load

Table I shows that by baking $B_4C$ preforms at or above 1400° C., uniform microstructures can be obtained. Baking above 1400° C. is believed to passivate $B_4C$ surfaces and slow down chemical reaction kinetics. This results in uniform parts which have an amount of unreacted free metal. These parts are not, however, suitable for use in applications that require prolonged high temperature (less than 1000° C.) exposure. Materials suitable for such applications should have (i) ceramic-ceramic interfaces free of metal to provide strength and (ii) a protective outer layer to reduce or minimize oxidation of the $B_4C$. The foregoing parts can meet this criteria if they are subjected to a post-infiltration heat-treatment in air.

As shown in Table I, a post-infiltration heat treatment at 690° C., in air for 50 hours provided an increase in hardness for all cermet pieces. The data in Table I show that, at least from a hardness point of view, $B_4C$ greenware baked at temperatures below 1800° C. yields better heat treated cermets than greenware baked at temperatures above 1800° C. The greenware that was baked at 1400° C. and 1700° C. results in cermets with uniform microstructures and high hardness values. The data in Table I further show that green $B_4C$ and $B_4C$ baked below 1400° C. produce uniform and hard parts when limited to small sizes (<10 mm vertical metal flow). As vertical metal flow distances exceed 10 mm in green $B_4C$ and $B_4C$ baked below 1400° C., hardness remains relatively high, but resulting parts exhibit nonuniform microstructures and cracking.

EXAMPLE 2

Pieces of greenware were prepared and infiltrated with or without baking as in Example 1. Chemical analysis of the infiltrated greenware pieces was completed using an MBX-CAMECA microprobe, available from Cameca Co., France. Crystalline phases were identified by X-ray diffraction (XRD) with a Phillips diffractometer using CuKa radiation and a scan rate of 2° per minute. The amount of Al present in the infiltrated greenware was estimated based upon differential scanning calorimetry (DSC). All of the greenware pieces were then heated from the melting point of Al (660° C.) to 900° C. over a period of one hour before 3× 4×45 mm specimens from one-half of the pieces were subjected to Flexure Strength testing using a four-point bend test (ASTM C1161) at 900° C. The samples were maintained in air at that temperature for 15 minutes before they were broken. Upper and lower span dimensions were 20 and 40 mm, respectively, and the specimens were broken using a crosshead speed of 0.5 mm/min. Specimens from the other pieces were subjected to an additional heat treatment for 25 hours in air at 690° C. before they were heated again to 900° C. over a period of one hour and broken in Flexure Strength testing.

The data presented in Table II show that the heat treatment history of greenware prior to infiltration has a marked influence upon Flexure Strength of the resultant $B_4C$/Al cermets. The data also show, particularly for Samples A and H, that metal content alone does not determine strength at elevated temperatures. The strength at high temperature is also affected by ceramic phases formed during infiltration. Samples G, H and I have the highest flexure strength values prior to a post-infiltration heat treatment. This may be due to fast chemical reaction kinetics in conjunction with a sufficient amount of $B_4C$. The data further show that the post-infiltration heat treatment leads to an increase in flexure strength. Nonetheless, only some of the samples reached a flexure strength level of >350 MPa.

Similar results are expected with other compositions and process conditions, all of which are disclosed herein.

TABLE II

| Sample Identification | Composition (wt % $B_4C$/wt % Al) | Greenware Bake Temperature (°C.) | Residual Al Content (wt %) | Flexure Strength (MPa) | Flexure Strength after Heat Treatment (MPa)* |
| --- | --- | --- | --- | --- | --- |
| A | 85/15 | 2200 | 10 | 188 | — |
| B | 80/20 | 2200 | 15 | 266 | 290 |
| C | 70/30 | 2200 | 25 | 170 | — |
| D | 80/20 | 1400 | 15 | 180 | 430 |
| E | 70/30 | 1400 | 25 | 170 | 450 |
| F | 64/36 | 1400 | 30 | 52 | 380 |
| G | 80/20 | 20 | 5 | 400 | — |
| H | 75/25 | 20 | 10 | 400 | 410 |
| I | 70/30 | 1300 | 15 | 383 | 390 |
| J | 45/55 | 1300 | 40 | 52 | — |

— means not measured; *means 25 hours in air at 690° C.

EXAMPLE 3

Cermet ($B_4C$—Al) samples having respective initial $B_4C$ and Al contents of 75 vol % and 25 vol % were prepared by baking $B_4C$ greenware at 1300° C. for 30 minutes and infiltrating the greenware with the same Al alloy as in Example 1 for 60 minutes at 1150° C. The greenware, prior to infiltration, was in the form of tiles measuring 120×120× 10 mm. After infiltration, the tiles were ground into 4×3×45 mm bars. The bars were divided into 4 groups. The first group (Group A) of samples were used as infiltrated, the second (Group B) was heat treated at 800° C. in argon for 100 hours, the third (Group C) was heat treated in air at 800° C. for 2 hours, the fourth (Group D) was heat treated in air at 800° C. for 100 hours. The samples were all subjected to Flexure Strength testing as in Example 2 save for changing the temperatures (Table III) at which samples were broken.

TABLE III

| Group/ Temperature | Flexure Strength (MPa) at Various Temperatures (°C.) | | | | | | | |
| --- | --- | --- | --- | --- | --- | --- | --- | --- |
| | 20 | 200 | 400 | 600 | 700 | 800 | 900 | 1100 |
| A | 520 | 510 | 460 | 320 | 300 | 240 | 200 | — |
| B* | — | — | — | 330 | 310 | 300 | 250 | — |
| C | — | — | — | 330 | 350 | 380 | 400 | 290 |
| D | — | 510 | 460 | 430 | 440 | — | 440 | 340 |

— means not measured; *means not an example of the invention

The data in Table III show that heat treatment in argon, an inert gas, does not enhance high temperature strength in the same manner as heat treatment in air. Both heat treatments produce B—Al—C phases, but only the heat treatment in air produces an oxidation layer that effectively stops metal flow towards cermet outer surfaces. Strength increases as a function of heat treatment time in air. Although samples from Group D (heat treated in air at 800° C. for 100 hours) have the same strength at room temperature as those of Group A (no heat treatment), they have a much higher strength above 600° C.

EXAMPLE 4

Cermet ($B_4C$—Al) samples having respective initial $B_4C$ and Al contents of 70 vol % and 30 vol % were prepared by baking $B_4C$ greenware at 1400° C. for 120 minutes and infiltrating the greenware with the same Al alloy as in Example 1 for 60 minutes at 1160° C. The greenware, prior to infiltration, was in the form of tiles measuring 120×120×

10 mm. After infiltration, the samples were cut into bars measuring 4×4×45 mm. The bars were then subjected to heat treatments in air at various temperatures for varying lengths of time, all of which are shown in Table IV. After completion of the heat treatment, the cross-sections cut from the bars were polished using, in succession, 30, 15, 6, 1 and 0.25 μm diamond pastes and subjected to scanning electron microscopy (SEM) to determine thickness of the resulting $Al_2O_3$ layer. The data reported in Table IV for each cross-section represent an average of 40 measurements.

TABLE IV

| Heat Treatment Temp (°C.) | $Al_2O_3$ Layer thickness (μm) at Heat Treatment Times (hours) | | | |
|---|---|---|---|---|
| | 50 | 100 | 200 | 500 |
| 600 | — | — | 2 | — |
| 700 | — | 6 | — | — |
| 800 | 12 | 12 | 11 | 18 |
| 850 | 13 | 16 | 20 | 22 |
| 900 | 18 | 27 | 50 | — |
| 1000 | — | 16 | 70 | — |
| 1100 | 80 | — | 350 | — |

The data presented in Table IV demonstrate that oxide layer thickness increases with increasing heat treatment times and temperatures. Similar results are expected with other times and temperatures as described herein. The data point for 1000° C. and 100 hours is believed to be in error based upon data trends for heat treatments of 200 hours duration.

EXAMPLE 5

Cermet ($B_4C$—Al) samples having respective initial $B_4C$ and Al contents of 70 vol % and 30 vol % were prepared by baking $B_4C$ greenware at 1300° C. for 30 minutes and infiltrating the greenware with the same Al alloy as in Example 1 for 60 minutes at 1160° C. The tiles were ground into test bars measuring 4×3×45 mm bars. All test bars were heat treated in argon for 100 hours. After the argon heat treatment, groups of the test bars were subjected to an additional heat treatment in air at 800° C. for lengths of time as shown in Table V. Oxide layer thicknesses, measured as in Example 4, and flexure strengths measured at 800° C. as in Example 2, are also shown in Table V.

TABLE V

| Heat Treatment Time in Air (Hours) | Flexure Strength (MPa) | Oxide Layer Thickness (μm) |
|---|---|---|
| 0 | 285 | 0 |
| 2 | 286 | 2 |
| 5 | 295 | 3 |
| 10 | 292 | 3 |
| 25 | 315 | 5 |
| 50 | 450 | 13 |
| 100 | 290 | 15 |

The data presented in Table V clearly show the effect of oxide layer. Fifty hours of heat treatment in air provided the maximum flexure strength. Similar results are expected with other compositions and processes as disclosed herein.

EXAMPLE 6

Cermet ($B_4C$—Al) samples having respective initial $B_4C$ and Al contents of 70 vol % and 30 vol % were prepared by baking $B_4C$ greenware at 1425° C. for 2 hours and infiltrating the greenware with the same Al alloy as in Example 1 for one hour at 1160° C. The samples were in the form of tiles measuring 120×120×16 mm. The hardness after infiltration was 720 kg/mm$^2$ and flexure strength at room temperature was 650 MPa. The tiles were subjected to a post-infiltration heat treatment in air at the temperatures and for the times shown in Table VI. After 50 hours, both tiles had a residual metal content, estimated as in Example 2, of 5–8 vol %. The data in Table VI represent hardness measurements resulting from the heat treatment.

TABLE VI

| Heat Treatment Temp (°C.) | Hardness Measurements (kg/mm$^2$) Heat Treatment Times (Hours) | | | | |
|---|---|---|---|---|---|
| | 5 | 10 | 15 | 25 | 50 |
| 700 | — | 871 | — | 1314 | 1674 |
| 800 | 1200 | 1230 | 1330 | 1565 | 1720 |

The data in Table VI demonstrate that hardness can be improved by post-infilitration heat treatments in air. Similar results are expected with other combinations of process conditions as disclosed herein.

EXAMPLE 7

Cermet ($B_4C$—Al) samples having respective initial $B_4C$ and Al contents of 70 vol % and 30 vol % were prepared by baking $B_4C$ greenware at 1800° C. for 1 hour and infiltrating the greenware with the same Al alloy as in Example 1 for one hour at 1160° C. The samples, in the form of tiles as in Example 6, were subjected to a post-infiltration heat treatment in air for 50 hours at a temperature of 690° C. The flexure strengths at room temperature and 800° C. were, respectively, 640 MPa and 410 MPa. The Hardness was 1680 kg/mm$^2$. The heat-treated cermets or structural composites also had a fracture toughness of 6.4 MPa·m$^{1/2}$ and a creep deformation, under a 250 MPa load at 900° C. for 100 hours, of 0.22 mm. The composites had an $Al_2O_3$ layer that was 10 μm thick and a microstructure that consisted of $B_4C$ grains surrounded by $AlB_2$, $Al_4BC$ and $AlB_{24}C_4$ as major ceramic phases.

EXAMPLE 8

Cermet ($B_4C$—Al) samples having respective initial $B_4C$ and Al contents of 68 vol % and 32 vol % were prepared by baking $B_4C$ greenware at 1300° C. for one hour and infiltrating the greenware with the same Al alloy as in Example 1 for two hours at 1180° C. The samples, in the form of tiles as in Example 6, were ground into 40 bars measuring 4×3×45 mm. One half (20) of the bars were subjected to a post-infiltration heat treatment in air for 25 hours at a temperature of 800° C. The other 20 bars were not heat treated. Ten bars from each set of bars were tested for flexure strength.

All bars were immersed in a 1N hydrochloric acid (HCl) bath for 30 minutes, one hour and five hours. HCl was used as it is known to attack Al and Al-containing borides and carbides. The bars were then removed from the bath, washed, dried and tested for flexure strength to evaluate structural damage. The bars that had been subjected to a post-infiltration heat treatment retained 88.1% of their original strength after 30 minutes of immersion, 86% after one hour of immersion and 83% after five hours of immersion. The other bars (no post-infiltration heat treatment) retained only 79.4% of their original strength after 30 minutes, 64% after one hour and 53% after 5 hours. This example shows that formation of a dense layer of $Al_2O_3$ on the surface of $B_4C$—Al cermet provides a structural composite with increased chemical resistance in comparison to a cermet that lacks the $Al_2O_3$ surface layer. The example also shows that the presence of the dense $Al_2O_3$ layer allows the composites to be used in a corrosive chemical environment.

What is claimed is:

1. A boron carbide-aluminum structural composite having a dense surface layer of aluminum oxide about 5 to 13 microns in thickness that is substantially free of carbon, and a microstructure that comprises isolated boron carbide grains or clusters of boron carbide grains surrounded by a multiphase matrix that comprises aluminum borides, aluminum borocarbides and free metal, the metal being aluminum or an aluminum alloy.

2. A composite as claimed in claim 1, wherein the boron carbide grains constitute from about 40 to about 75 percent by volume and the matrix comprises from about 20 to about 50 percent by volume of aluminum borides and aluminum borocarbides and from about 2 to about 8 percent by weight of aluminum or aluminum alloy, all percentages being based upon composite volume and totaling 100 percent.

3. A composite as claimed in claim 1, wherein the aluminum borides and aluminum borocarbides are selected from the group consisting of $AlB_2$, $Al_4BC$, $AlB_{12}$ and $AlB_{24}C_4$.

4. A composite as claimed in claim 3, wherein $AlB_{24}C_4$ and $AlB_2$ are present in a ratio of $AlB_{24}C_4/AlB_2$ that is within a range of from about 10:1 to about 2:1.

5. A composite as claimed in claim 1, wherein the microstructure further comprises an amount of ceramic filler material, the filler material being present as isolated grains or as part of the clusters of boron carbide grains, the amount being from about 1 to about 25 percent by volume, based upon total composite volume.

6. A composite as claimed in claim 5, wherein the ceramic filler material is at least one of titanium diboride, titanium carbide, silicon boride, aluminum oxide and silicon carbide.

7. A composite as claimed in claim 1, wherein the composite has a dense surface layer that consists essentially of aluminum oxide and is substantially free of carbon and boron.

* * * * *